United States Patent [19]

Ito et al.

[11] Patent Number: 5,302,471
[45] Date of Patent: Apr. 12, 1994

[54] COMPACT PHOSPHORIC ACID FUEL CELL SYSTEM AND OPERATING METHOD THEREOF

[75] Inventors: Tsukasa Ito, Sumoto; Nobuyoshi Nishizawa, Neyagawa; Akira Hamada, Kadoma; Akihiro Furuse, Sumoto, all of Japan

[73] Assignee: Sanyo Electric Co. Ltd., Osaka, Japan

[21] Appl. No.: 864,763

[22] Filed: Apr. 7, 1992

[30] Foreign Application Priority Data

Apr. 8, 1991 [JP] Japan ............................. 3-75180

[51] Int. Cl.⁵ ............................................. H01M 27/14
[52] U.S. Cl. ................................... 429/24; 429/26
[58] Field of Search ................................. 429/24, 26

[56] References Cited

U.S. PATENT DOCUMENTS 3,857,735 12/1974 Louis et al. ........................... 429/24

FOREIGN PATENT DOCUMENTS 3-15305  2/1991  Japan .

Primary Examiner—Prince Willis, Jr.
Assistant Examiner—M. Nuzzolillo
Attorney, Agent, or Firm—Armstrong, Westerman, Hattori, McLeland & Naughton

[57] ABSTRACT

Disclosed is an operating method of a compact phosphoric acid fuel cell system whose operation is started and stopped repeatedly, comprising a lamination of a plurality of cell units each of which has an electrolyte matrix impregnated with a phosphoric acid electrolyte between a positive electrode and a negative electrode, characterized by being operated so that each of the cell units can have a phosphoric acid electrolyte whose density is partially less than 91.6 wt % during the operation.

12 Claims, 7 Drawing Sheets

COMPACT PHOSPHORIC ACID FUEL CELL SYSTEM AND OPERATING METHOD THEREOF

BACKGROUND OF THE INVENTION (1) Field of the Invention

This invention relates to a compact phosphoric acid fuel cell system whose operation is started and stopped repeatedly, and an operating method thereof.

(2) Description of the Related Art

Conventional phosphoric acid fuel cells are generally operated in the temperature range of 150°–210° C., in consideration of the performance of the cells themselves, durability and life of materials used for them and other requirements. Most of these phosphoric acid fuel cells are large-sized like ones used in electric power plants, and are operated continuously for as a long period of time as thousands hours.

On the other hand, as electric power supply for communication equipment, building or civil engineering works, a compact and portable phosphoric acid fuel cell has recently been drawing attention which can be operated for a desired period of time and at desired occasions, whose operation is started and stopped far more times than those of the large-sized fuel cells.

The above-mentioned conventional large-sized phosphoric acid fuel cells have the following problem.

The phosphoric acid electrolyte of such a fuel cell has a very high concentration when the cell is operated in a high temperature of 150°–210° C. as shown in FIG. 5. When the operation of the cell is stopped with such a high concentration of the electrolyte, the liquid electrolyte turns to be completely solid as a result of icing of the phosphoric acid at room temperature as shown in FIG. 6. This causes electrolytic resistance to grow greatly, making the operation of the cell difficult to start up at room temperature.

In order to change the solidified phosphoric acid electrolyte with high resistance into a liquid one with low resistance again, the cell has to be heated to a certain degree. However, the large-sized fuel cell, for raising its temperature, demands another apparatus to supply a heating medium with great energy because the fuel cell has a large heat capacity itself.

On the other hand, in order to prevent a liquid phosphoric acid electrolyte from solidifying completely, an electric heater has been provided to keep the temperature of the cell over the icing point of phosphoric acid (at 100° C., for example).

However, the compact fuel cell can not employ the above-mentioned heating medium and electric heater because the apparatuses demand an energy supply source and makes the fuel cell system larger and heaviers, which is far from being compact and portable. Therefore, the above problem caused by complete solidification of phosphoric acid must be solved with a different method to realize a compact power source.

One method is disclosed in Japanese Patent Publication No. 3-15305 according to which solidification of phosphoric acid is avoided by lowering the concentration of phosphoric acid electrolyte for the purpose of lowering its icing point. This is executed by supplying the fuel cell with moist gas from at least one side of an oxidizing gas system and a fuel gas system when the operation of the cell is stopped.

However, this method still can not solve the above problem because the fuel cell demands an apparatus to supply moist gas, which makes the fuel cell system larger and heavier without realizing a compact and portable cell.

SUMMARY OF THE INVENTION

The object of this invention is, therefore, to provide a compact and portable phosphoric acid fuel cell system whose operation can be started up even if the temperature of the fuel cell falls around room temperature after the stop of the operation, and an operating method thereof.

The above object can be achieved by an operating method of a compact phosphoric acid fuel cell system whose operation is started and stopped repeatedly, comprising a lamination of a plurality of cell units each of which has an electrolyte matrix impregnated with a phosphoric acid electrolyte between a positive electrode and a negative electrode, characterized by being operated so that each of the cell units can have a phosphoric acid electrolyte whose density is partially less than 91.6 wt % during the operation.

The above method can comprise a first step of detecting the temperature inside the fuel cell and a second step of controlling the amount of air supplied to the fuel cell according to the detected temperature.

The temperature detected in the first step can be the highest in the temperature distribution inside the cell stack.

The above object can be achieved also by a compact phosphoric acid fuel cell system whose operation is started and stopped repeatedly, having a cell stack comprising a plurality of cell units each of which has an electrolyte matrix impregnated with a phosphoric acid electrolyte and disposed between a positive electrode and a negative electrode; an air supply device for supplying air which is necessary for cell reactions; a temperature sensor for detecting the temperature inside the cell stack; and an air amount controlling device for controlling the amount of air supplied to the fuel cell according to the detected temperature so that each of the cell units can have a phosphoric acid whose concentration is partially less than 91.6 wt %.

The temperature sensor can detect the highest temperature inside the cell stack.

The temperature sensor can be installed at the center of a surface of the cell stack from which the air exits.

According to this invention, the above object can be achieved in accordance with the following.

A fuel cell takes cooling air in to keep it at an uniform temperature and to stabilize its performance. The difference of the temperature between the cooling air and the fuel cell generates a temperature gradient inside the cell. For example, if air of low temperature (20° C.) is supplied, the closer to the exit of the air, the higher the temperature becomes as shown in FIG. 4.

As apparent from the phosphoric acid concentration curve shown in FIG. 5, the equilibrium density of phosphoric acid used as an electrolyte varies depending on the temperature of the cell. Therefore, when there is a temperature gradient as shown in FIG. 4, the concentration of phosphoric acid becomes heterogeneous inside the cell, that is, the concentration is lower around the entrance of the cooling air where the temperature of the cell is lower, and is higher around the exit of the air where the temperature is higher.

In an actual fuel cell, both each electrolyte matrix and each electrode catalyst layer constituting electrodes have a thickness of about 0.1–0.4 mm, and phosphoric acid electrolyte is generally held in crevices among them, so that the electrolyte does not diffuse easily. Another factor making it difficult for the electrolyte to diffuse is that the phosphoric acid having a high concentration has a very high viscosity. Therefore, a concentration gradient still remains inside a fuel cell when the operation of the cell is stopped.

Shown in FIG. 6 is the icing point of a phosphoric acid solution used as the electrolyte of a phosphoric acid fuel cell. [W. H. Ross, H. M. Jones: J. of Am. Chem. Soc., 47, 2165 (1925)]. As apparent from FIG. 6, when concentration of phosphoric acid is 91.6 wt % or more, the phosphoric acid solution solidifies at a temperature of 23.5° C. or lower, while when the concentration is less than 91.6 wt %, the solution does not solidify completely until the temperature goes down to −85° C. or lower. Therefore, if a fuel cell is operated with a phosphoric acid electrolyte having concentration of 91.6 wt % or more, the electrolyte possibly solidifies completely when the cell temperature goes down to outside air temperature. On the other hand, if the fuel cell is operated with the electrolyte having concentration of less than 91.6 wt %, the electrolyte may become a mixture of a solid and a liquid at a temperature of 29.3° C. or lower, but at least still retains a liquid portion because its solidification point is as low as −85° C. Therefore, according to this invention, a portion of the liquid electrolyte can be retained between the positive and negative electrodes even when its temperature goes down to outside air temperature after its operation is stopped by operating the fuel cell so that each cell unit can have the phosphoric acid electrolyte whose concentration is partially less than 91.6 wt %. Consequently, the cell can avoid being occupied by solid electrolyte having high resistance.

Also, the operation of the cell can be started up at the retained liquid portion having low resistance, and at the same time, the solidified portion having high electrolytic resistance can be changed into a state of liquidity having low electrolytic resistance again. This is because the temperature of the cell raises as a result of the cell being heated by the heat corresponding to overvoltage at the reacting electrode when the operation of a phosphoric acid fuel cell is started up. This improves starting performance of the cell by its being easily started up at a low temperature.

According to a compact phosphoric acid fuel cell of this invention, the temperature of the cell can be raised at the speed of 5°–30° C./min by controlling loads and the amount of air taken in the cell and consequently be raised in several minutes.

Furthermore, as apparent from FIG. 5, when a fuel cell is operated at a low temperature, the concentration of a phosphoric acid electrolyte decreases. At the starting point of the operation of the fuel cell, the concentration of the electrolyte becomes lower under a low temperature condition. However, since the temperature of the fuel cell can be raised in such a short time as mentioned above, the time period that the fuel cell is operated at the low temperature and low density becomes short.

It is also possible to combine conventional methods of heating cooling air used to cool the cell or of supplying heat to a heating medium from outside in order to raise the temperature of the cell, with the above method of utilizing the heat corresponding to the overvoltage. This realizes as a small heating apparatus as possible, making the entire system compact and light-weight.

Furthermore, even when the heating apparatus is out of order, the fuel cell can be started up only by the heat corresponding to the overvoltage.

In order to retain a liquid electrolyte inside a cell after its operation is stopped, it is effective to allow each of the cell units in the cell stack to have a temperature range where the equilibrium concentration of the phosphoric acid is less than 91.6 wt %, that is, a temperature range including 90° C. or lower during its operation for the following reason.

The concentration of phosphoric acid in a fuel cell is about 100 wt % when it is operated at a high temperature of 150°–210° C. in a conventional manner. However, when the temperature is 90° C. or lower, the concentration of phosphoric acid becomes less than 91.6 wt %. The equilibrium concentration of phosphoric acid as an electrolyte changes depending on the temperature, the humidity and the amount of the air supplied, the current running within the cell or other conditions, but a liquid phosphoric acid can be retained even after the operation of the fuel cell is stopped by allowing the cell units in the cell stack to have a temperature range including 90° or lower to make the equilibrium concentration of the phosphoric acid less than 91.6 wt %.

On the other hand, in a low temperature condition as above, the water generated as a result of reactions possibly remains inside the cell stack without evaporating. However, this problem can be easily solved by evaporating the water with a large amount of air supplied to the fuel cell.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
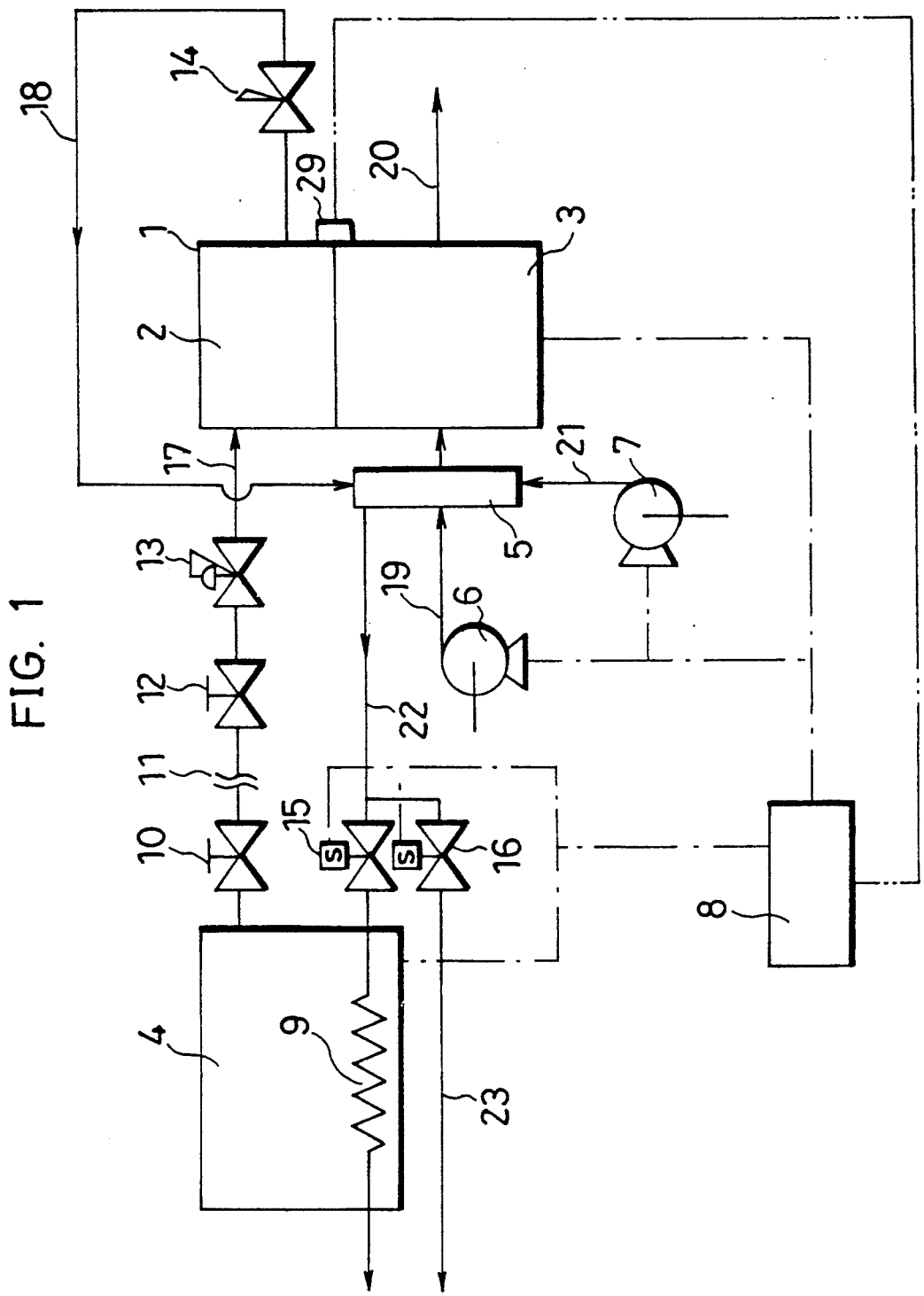
FIG. 1 is a flow diagram showing the system of a compact phosphoric acid fuel cell according to the present invention.

As shown in FIG. 1, the system of a fuel cell of the present invention is mainly composed of a fuel cell 1 (Here, it is represented only by a negative electrode 2 and a positive electrode 3 for convenience), a hydrogen reservoir 4 for reserving pure hydrogen which is fuel used for the fuel cell 1, an unreacted fuel processor 5 for processing fuel which was not concerned with reactions in the fuel cell 1, an air supply fan 6 for supplying air to the fuel cell 1, a temperature sensor 29 installed at a position having the highest temperature inside the cell stack (the center of a side surface of the cell stack from which the air exits) and a system control circuit 8 for controlling the fuel cell system.

Further provided to this system are another air supply fan 7 for the unreacted fuel processor for supplying air to the unreacted fuel processor 5 in order to apply with catalytic combustion to unreacted fuel, a heat exchanger 9, a connecter 11 for connecting the hydrogen reservoir 4 with this system, fuel gas valves 10 and 12 provided on both sides of the connecter 11 which operate when the hydrogen reservoir 4 is detached from this system, a fuel gas pressure regulating valve 13 for controlling the amount of fuel gas which is transported from the hydrogen reservoir 4 to the fuel cell 1 through a fuel gas transport path 17, a combustion gas transport valve 15 for transporting combustion gas exhausted from the unreacted fuel processor 5 to the heat exchanger 9 through a combustion gas path 22, a combustion gas exhaust valve 16 for transporting combustion gas exhausted from the unreacted fuel processor 5 to a combustion gas path 23, an exhaust fuel path 18 for transporting exhaust fuel gas to the unreacted fuel processor 5 in which an exhaust fuel gas exhaust valve 14 is provided for controlling the amount of exhaust fuel gas, an air transport path 19 for transporting air from the air supply fan 6 to the fuel cell 1, another air transport path 21 for transporting air from the air supply fan 7 to the unreacted fuel processor 5, and an exhaust air path 20 for exhausting air which was not concerned with reaction in the fuel cell 1 to the atmosphere.

Figure 2:
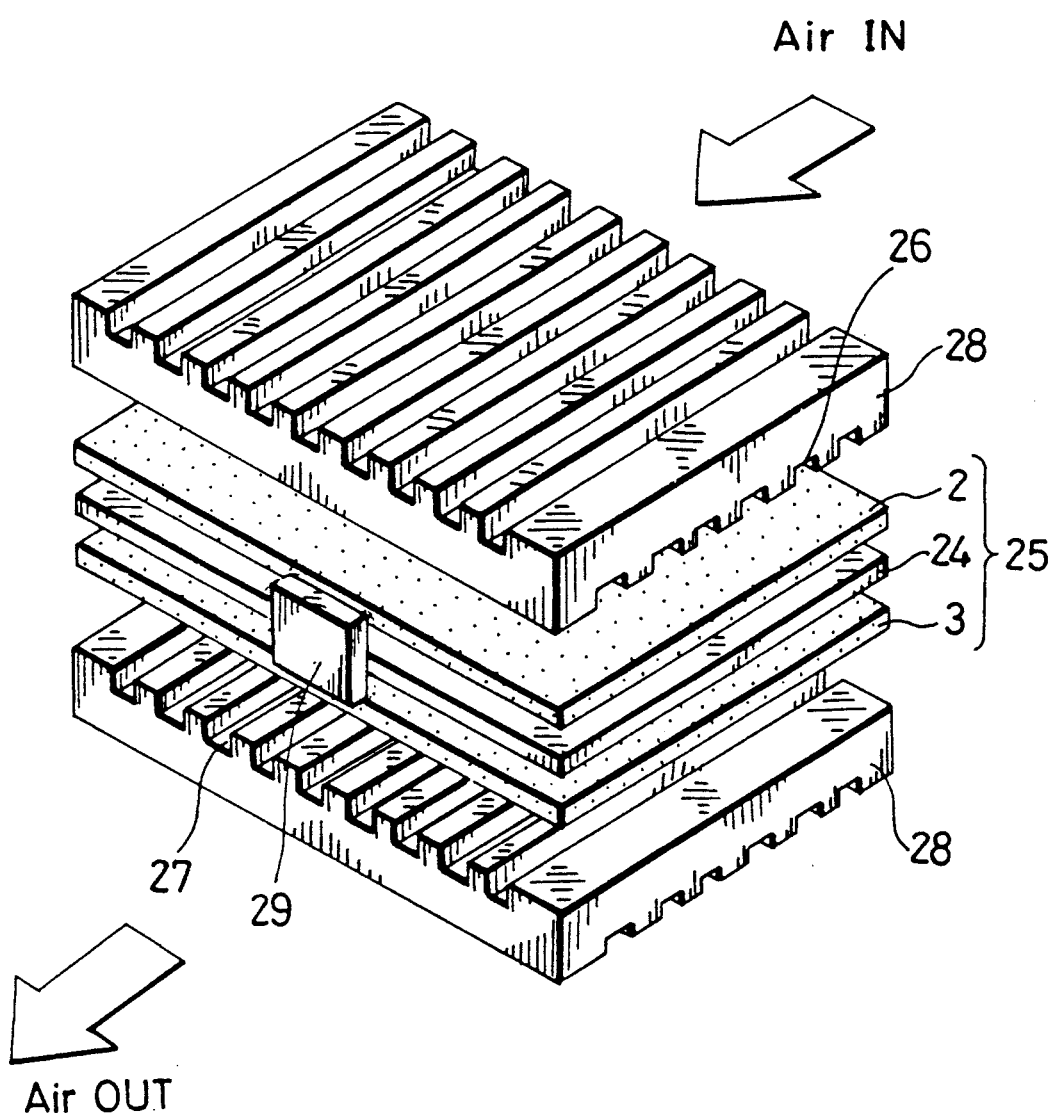
FIG. 2 is an exploded perspective view of the main portion of a cell shown in FIG. 1.

The fuel cell 1 is, as shown in FIG. 2, composed of a cell stack comprising a plurality of cells units 25 (for example twenty-five cell units) and a plurality of bipolar plates 28 which are accumulated alternatively, and end plates (not shown) disposed on top and at the bottom of the cell stack for tightening. Each of the cell units 25 is composed of a positive electrode 3 and a negative electrode 2 which are made from carbon paper laminated a catalyst such as platinum, and an electrolyte matrix made from silicon carbonate (SiC) disposed between the electrodes and impregnated with phosphoric acid electrolyte. Each of the bipolar plate 28 is made from graphite and has hydrogen supply grooves 26 on one surface and air supply grooves 27 on the other surface. Moreover, the fuel cell 1 has fuel gas supplying/exhausting manifolds and air supplying/exhausting manifolds (both not shown) provided respectively at both facing sides of the fuel cell stack. The end plates and the manifolds are all made from a PEEK resin (polyetheretherketone) having excellent heat and acid resisting characteristics, which contributes to realizing lightening of this system. Cooling of the fuel cell 1 is carried out by use of oversupplied reacting air.

The reason that the temperature sensor 29 is installed at the position having the highest temperature inside the cell stack, that is, the center of a side surface of the cell stack from which the air exits, is as follows.

Figure 4:
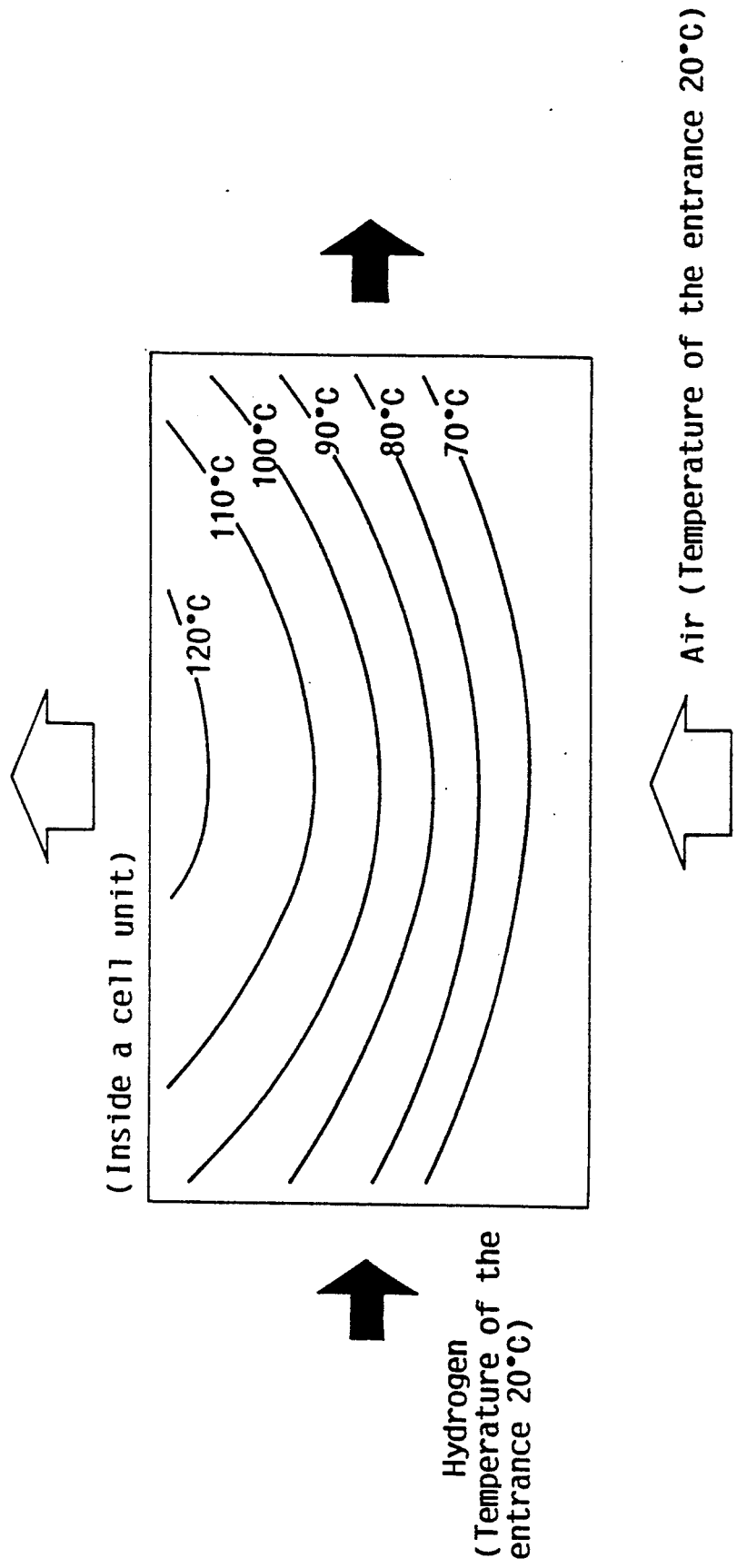
FIG. 4 is a graph showing temperature distribution inside a cell unit.
Figure 5:
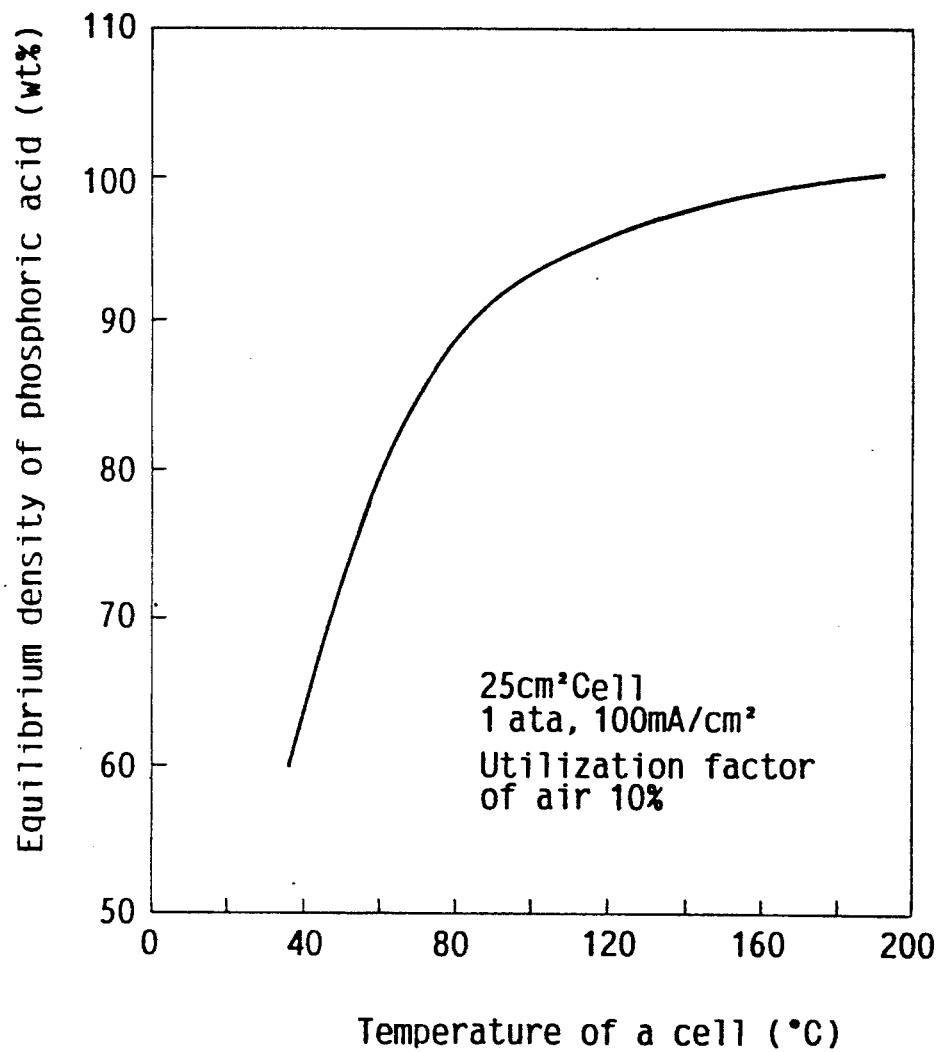
FIG. 5 is a graph showing a relationship between temperature and the concentration of equilibrium phosphoric acid inside a phosphoric acid fuel cell.
Figure 6:
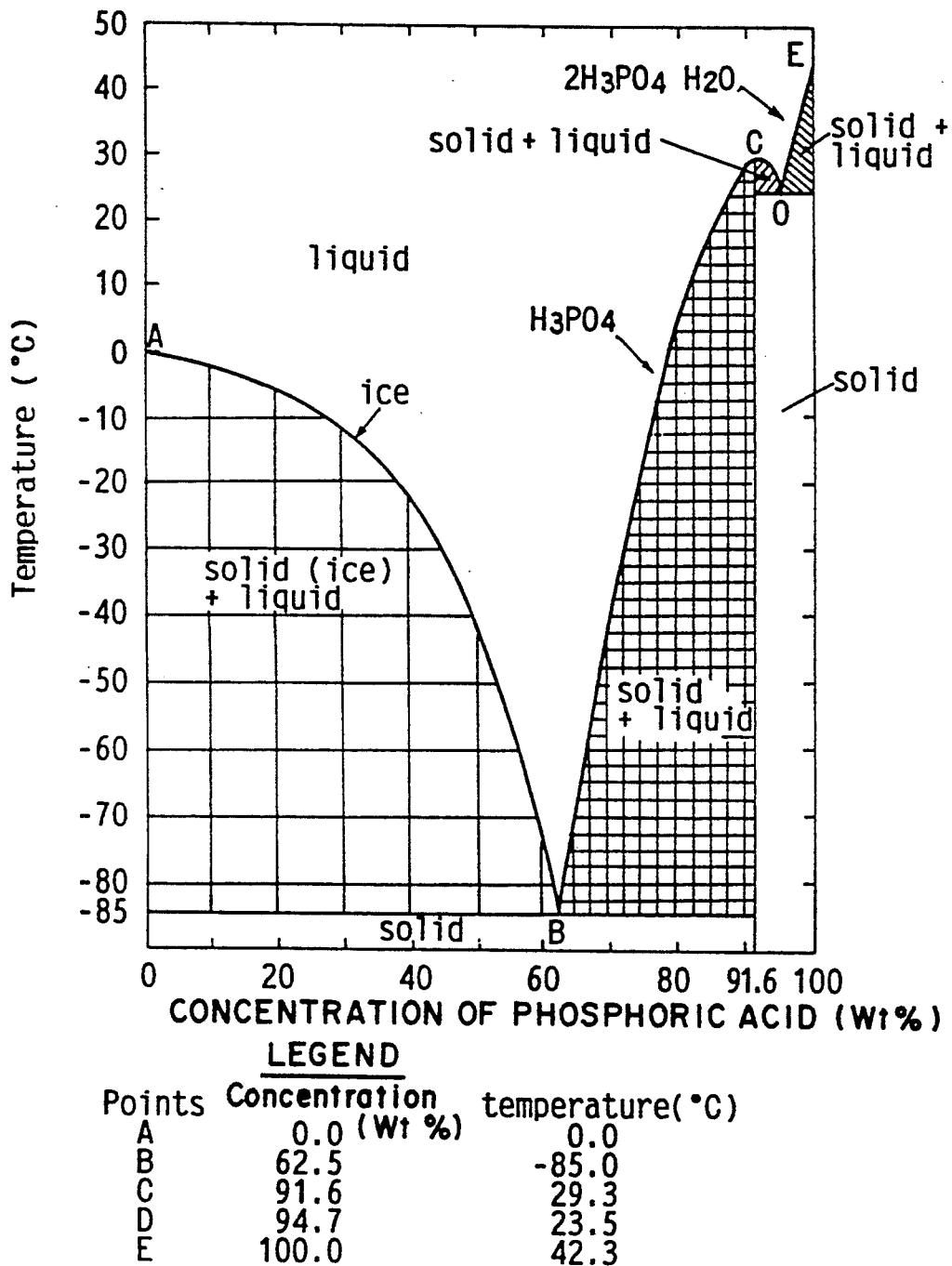
FIG. 6 is a graph showing icing points of phosphoric acid solutions.
Figure 7:
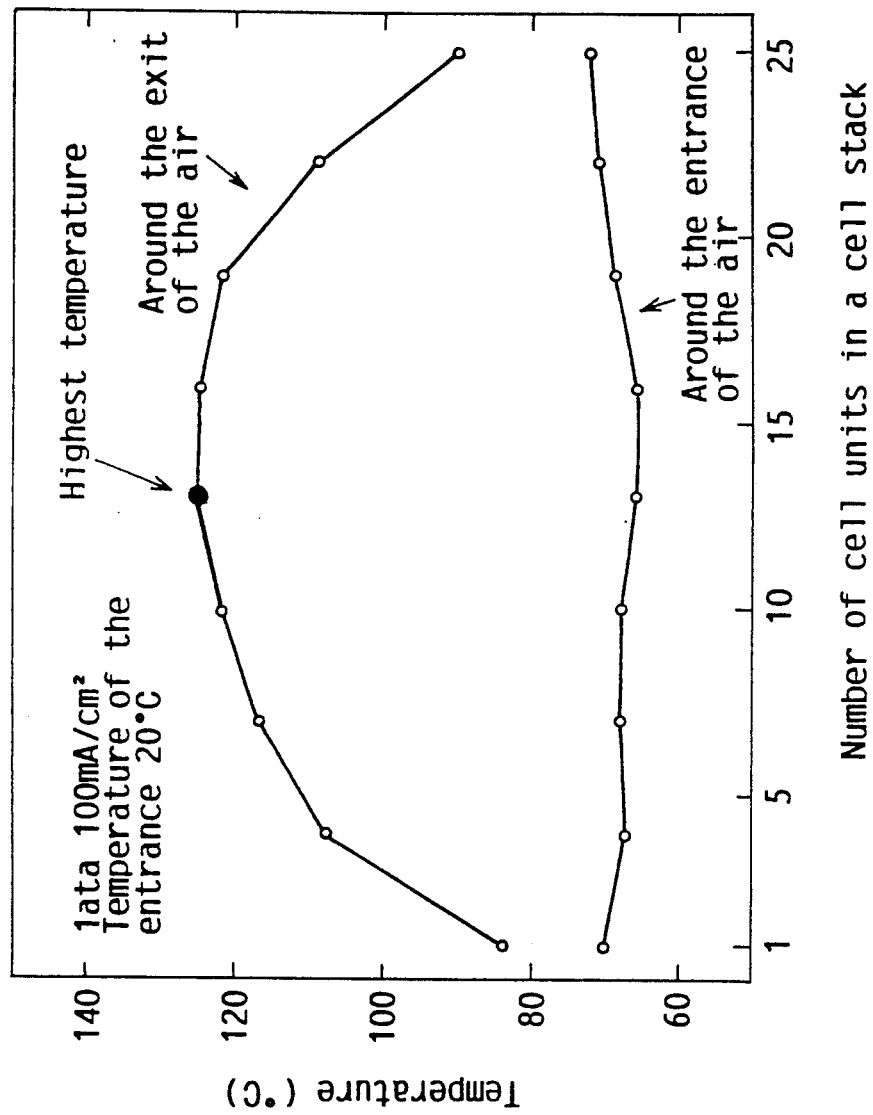
FIG. 7 is a graph showing a temperature distribution inside cell units in a cell stack.

As apparent from FIG. 7, the temperature of the cell stack having twenty-five accumulated cell units is highest around an exit of the air of a 13th cell unit (hereinafter referred to as "cell unit 25a") which is positioned in the middle of the accumulation, and becomes lower and lower as closing to the end plates. Therefore, the cell unit 25a whose temperature distribution is shown in FIG. 4, can partially have a temperature of 90° C. or lower (where the concentration of phosphoric acid electrolyte is less than 91.6 wt %) by controlling the operation of the fuel cell so that the highest temperature around the exit of the air of the cell unit 25a can be, for example, around 130° C. Consequently, each of the other cell units can also have part whose temperature is 90° C. or lower (where the concentration of phosphoric acid electrolyte is less than 91.6 wt %).

One method of controlling the operation of the fuel cell for the above-mentioned purpose is controlling the amount of air supplied to the fuel cell 1 by adjusting the rotating speed of the air supply fan 6 to the temperature detected by the temperature sensor 29.

The hydrogen reservoir 4 employs a hydrogen-absorbing alloy having dissociation pressure higher than that of the atmosphere under the condition of the temperature range of from −20° C.–room temperature, and is connected with the system through the connecting path 11 by which the reservoir 4 can be easily detached if needed. Used for the hydrogen-absorbing alloy is a rare earth-Ni system, a Ti-Fe system, a Ti-Gr system or the like.

The unreacted fuel processor 5 is an apparatus for processing unreacted hydrogen transported through the exhaust fuel path 18, and air supplied by the air supply fan 7 through the burnt air transport path 21 by applying catalytic combustion. Then, the combustion gas exhausted from the processor 5 by catalytic combustion is released to the atmosphere after heat-exchanged with the hydrogen from the hydrogen reservoir 4 through the combustion gas path 22 and the burnt exhaust gas transport valve 15, or is directly released to the atmosphere through the combustion gas path 22, the combustion gas exhaust valve 16 and a combustion gas path 23.

The system control circuit 8 controls the amount of air by detecting the temperature and the current of the fuel cell 1, the amount of combustion gas supplied to the heat exchanger 9 by detecting the temperature of the hydrogen reservoir 4, the amount of electric power between a secondary cell (not shown) provided for starting up and the fuel cell, and operation of the circuit of a heater (not shown) for raising temperature.

The fuel gas pressure regulating valve 13 is provided in the fuel gas transport path 17 and operates to keep a certain pressure inside the negative electrode 2. More precisely, the valve 13 adjusts its opening degree depending on the internal pressure of the negative electrode 2, in order to control the running gas according to the amount of a load.

The following is a description of the operation of a fuel cell system of the present invention constructed as above. First, raising the temperature of the cell is carried out as follows. The hydrogen reservoir 4 supplies hydrogen to the fuel cell 1 through the fuel gas transport path 17. Then, the exhaust fuel gas exhaust valve 14 opens and the negative electrode 2 is supplied with hydrogen. Also, the air supply fan 7 and the air supply fan 6 are started up with electric power supplied by the secondary cell provided for starting up, and catalytic combustion of hydrogen begins inside the unreacted fuel processor 5. After the heat of reaction generated by the catalytic combustion and the air supplied by the air supply fan 6 through the air transport path 19 are heat-exchanged, the air is supplied to the cell 1 to raise its temperature. At the same time, open circuit voltage is generated because the negative electrode 2 is supplied with hydrogen, and the positive electrode 3 is supplied with air by the air supply fan 6 through the air transport path 19 and the unreacted fuel processor 5. When the voltage of the cell 1 comes up over the reference voltage, its temperature begins to be raised by connecting the loads. The unreacted air in the positive electrode 3 is released to the atmosphere through the exhaust air path 20.

Used as loads for raising temperature of the cell are an electric heater (not shown) provided inside the end plates of the fuel cell 1, charge of the secondary cell, the air supply fans 6 and 7, and the system control circuit 8. Since the performance of the cell improves according to the raising of the temperature, the loads are increased to prevent the cell voltage from falling below the reference voltage, using the air supply fans 6 and 7, the system control circuit 8, charge of the secondary cell and the electric heater. When the temperature of the cell grows high enough to obtain the rated power, supplying of electric power to the electric heater provided inside the both end plates of the fuel cell 1 is stopped. After that, the system control circuit 8 controls the temperature of the cell by managing the rotating speed of the air supply fan 6 according to the loads and the temperature of the cell. In the fuel supply system, the amount of hydrogen consumed in the negative electrode 2 varies according to the change of the cell loads, and the amount of hydrogen supplied to the fuel cell 1 is controlled by the fuel gas pressure regulating valve 13. The amount of exhaust fuel is controlled by the opening degree of the exhaust fuel gas exhaust valve 14.

On the other hand, since the hydrogen reservoir 4 employs a hydrogen-absorbing alloy, the temperature of the alloy goes down and consequently the desorbing pressure lowers in accordance with desorbing of hydrogen. In order to restrain this, the exhaust gas which is applied with catalytic combustion by the unreacted fuel processor 5 is heat-exchanged with the hydrogen from the hydrogen reservoir 4 by going through the heat exchanger 9 provided in the hydrogen reservoir 4 through the combustion gas path 22. When the temperature of the hydrogen reservoir 4 exceeded the rated temperature as a result of excess exhaust gas transported to the heat exchanger 9, the amount of the exhaust gas is controlled by operating the combustion gas transport valve 15 and the combustion gas exhaust valve 16. Thus, the temperature of the hydrogen reservoir 4 is prevented from raising too much.

According to the above method, this system can supply electric power in a shorter time than the conventional system (for example, if the temperature of the cell is 20° C. when its operation is stopped, the rated load can be obtained in about five minutes), and carry out stable operation.

The system having the above construction is hereinafter called System(A).

Experiment

Figure 3:
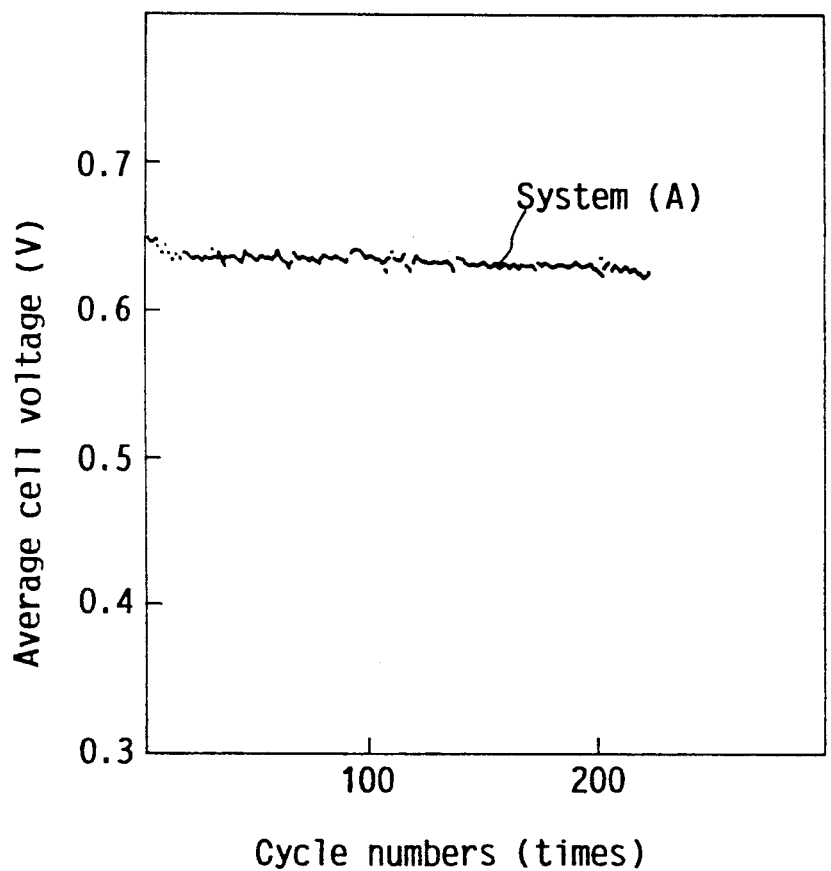
FIG. 3 is a graph showing cycle characteristics of (A) system according to the present invention.

Cycle characteristics of a cell of (A)system according to this invention was examined under the conditions that the operation of the cell is stopped after six hour continuous operation once a day. The results are shown in FIG. 3. The conditions of this experiment were at 1 ata, 100 mA/cm$^2$, and the cell stack was controlled so as to have its highest temperature of around 130° C. during the operation. FIG. 7 shows the temperature distribution inside the cell units in the cell stack during the operation.

As apparent from FIG. 3, the cell performance is hardly deteriorated even after more than 200 times of starting/stopping operation are carried out according to (A)system of this invention. This seems to be because of the following reason.

Each cell unit has a phosphoric acid electrolyte whose concentration is partially less than 91.6 wt % so that the liquid electrolyte can be partially retained between the positive and negative electrodes even when its temperature goes down to outside air temperature after its operation is stopped. Consequently, the cell can avoid being occupied by solid electrolyte having high resistance and the operation of the cell can be started up at the retained liquid portion having low resistance again.

At the same time, the solidified portion having high electrolytic resistance can be changed into a state of liquidity having low electrolytic resistance again because the temperature of the cell raises as a result of the cell being heated by the heat corresponding to overvoltage at the reacting electrode when the operation of the cell is started up. This improves starting performance of the cell by its being easily started up at a low temperature.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

what is claimed is:

1. A method for controlling the concentration of phosphoric acid during operation of a compact phosphoric acid fuel cell system whose operation is started and stopped repeatedly, comprising:
   providing a cell stack having a plurality of cell units each of which has an electrolyte matrix impregnated with a phosphoric acid electrolyte between a positive electrode and a negative electrode,
   operating and stopping the fuel cell system repeatedly; and
   controlling the phosphoric acid concentration of the fuel cell system so that each of the cell units has a phosphoric acid electrolyte whose concentration is in at least a portion thereof less than 91.6 wt % during the operating of the fuel cell system.

2. The method of claim 1 wherein the controlling step comprises:
   a first step of detecting the temperature inside the fuel cell; and
   a second step of controlling the amount of air supplied to the fuel cell so that the detected temperature is within an operating temperature range.

3. The method of claim 2, wherein the area of the fuel cell where the temperature is detected in the first step is a point highest in the temperature distribution inside the cell stack.

4. An operating method of a compact phosphoric acid fuel cell system whose operation is started and stopped repeatedly, comprising:
   providing a cell stack having a plurality of cell units each of which has an electrolyte matrix impregnated with a phosphoric acid electrolyte between a positive electrode and a negative electrode,
   operating the fuel cell system;
   controlling the fuel cell system so that each of the cell units has a temperature range including at least a portion having a temperature at 90° C. or lower during the operation.

5. An operating method of claim 4 wherein the controlling step comprises:

a first step of detecting the temperature inside the fuel cell; and a second step of controlling the amount of air supplied to the fuel cell according to the detected temperature.

6. An operating method of claim 5, wherein the area of the fuel cell where the temperature is detected in the first step is a point highest in the temperature distribution inside the cell stack.

7. A compact phosphoric acid fuel cell system whose operation is started and stopped repeatedly, comprising:

a cell stack comprising a plurality of cell units each of which has an electrolyte matrix impregnated with a phosphoric acid electrolyte and disposed between a positive electrode and a negative electrode;

air supply means for supplying air which is necessary for cell reactions;

a temperature sensor for detecting the temperature inside the cell stack; and air amount controlling means for controlling the amount of air supplied to the fuel cell according to the detected temperature so that each of the cell units can have a phosphoric acid whose concentration is at least in part less than 91.6 wt % during operation of the fuel cell system.

8. A compact phosphoric acid fuel cell system of claim 7, wherein the temperature sensor detects the highest temperature inside the cell stack.

9. A compact phosphoric acid fuel cell system of claim 8, wherein the temperature sensor is installed at the center of a side surface of the cell stack from which the air exits.

10. A compact phosphoric acid fuel cell system whose operation is started and stopped repeatedly, comprising:

a cell stack comprising a plurality of cell units each of which has an electrolyte matrix impregnated with a phosphoric acid electrolyte and disposed between a positive electrode and a negative electrode;

air supply means for supplying air which is necessary for cell reactions;

a temperature sensor for detecting the temperature inside the cell stack; and air amount controlling means for controlling the amount of air supplied to the fuel cell according to the detected temperature so that each of the cell units can have a temperature range including at least a portion having a temperature at 90° C. or lower.

11. A compact phosphoric acid fuel cell system of claim 10, wherein the temperature sensor detects the highest in the temperature distribution inside the cell stack.

12. A compact phosphoric acid fuel cell system of claim 11, wherein the temperature sensor is installed at the center of a side surface of the cell stack from which the air exits.

* * * * *